United States Patent Office 3,123,071
Patented Mar. 3, 1964

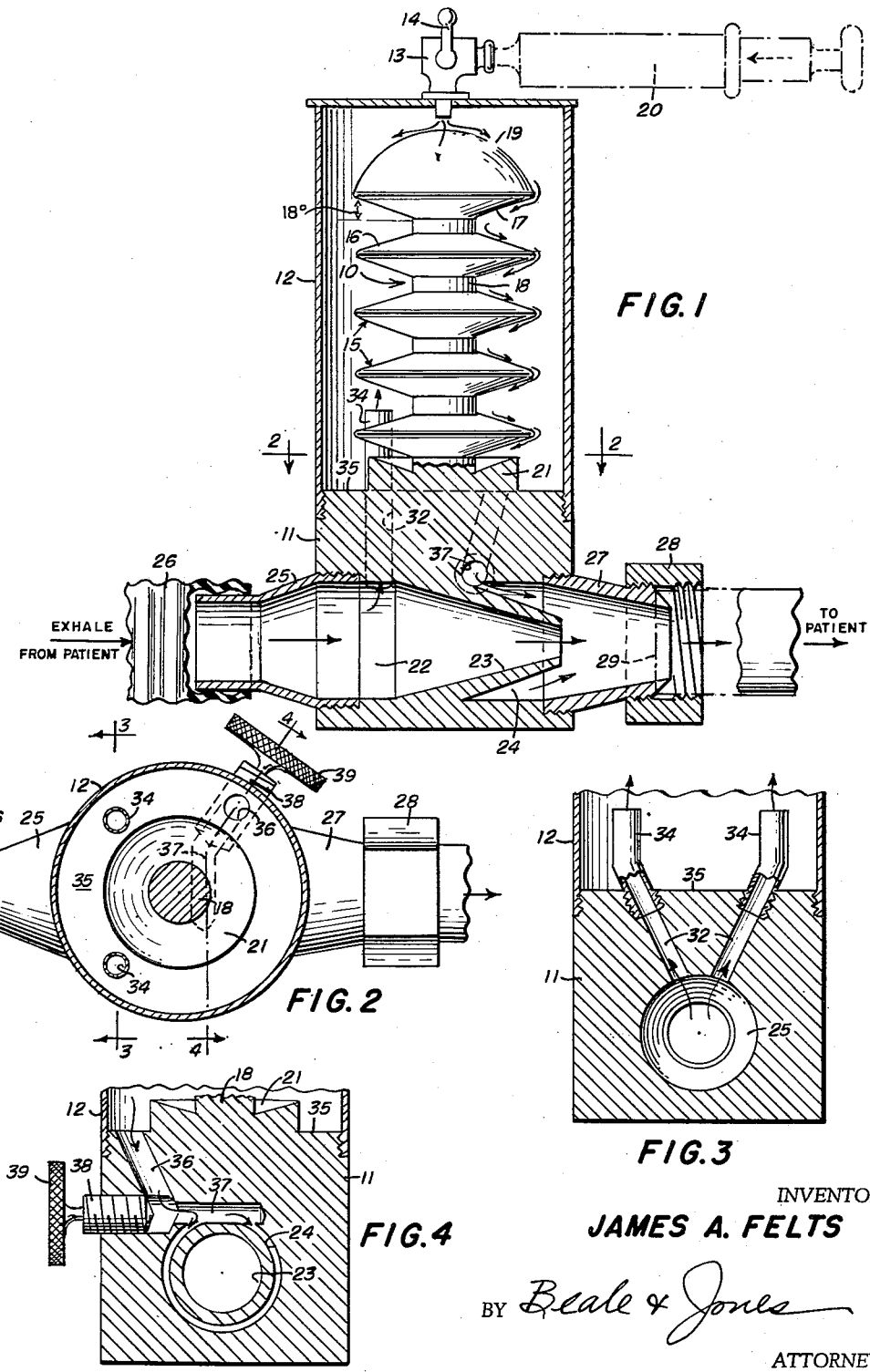

3,123,071
ANESTHETIC VAPORIZER
James A. Felts, 517 Bainbridge Road, Marion, Ill.
Filed Jan. 11, 1961, Ser. No. 82,043
12 Claims. (Cl. 128—188)

This invention comprises an anesthetic vaporizer for use in closed circuit circle absorption anesthesia systems.

In closed circuit circle absorption anesthesia the respiratory system of the patient is connected with an anesthesia apparatus in an air-tight system, there being no connection between the atmospheric air and the mixture of gases within the system. Anesthetic agents are admitted to the closed system, oxygen is added to meet the patient's metabolic requirements, and carbon dioxide is removed by passsing the respired mixture through a canister containing soda lime or some other alkaline material which will absorb acid gases. A rubber bag in the system, known as a rebreathing bag, allows the volume of the system to vary with the expansion and contraction of the patient's lungs as he breathes. The gaseous mixture in the circle absorption system normally circulates in only one direction. A Y connector adapts the patient's face mask to the system. Check valves in the system insure that the patient exhales into one branch of the Y, through the soda lime canister and into the rubber bag, and inhales through the other branch of the Y. The function of an anesthetic vaporizer in such a system is to receive the volatile liquid anesthetic, vaporize it and entrain it in the system's gaseous stream.

All of the anesthetic vaporizers in general use at present have serious limitations. In one device, a needle valve is used to drip the required amounts of liquid anesthetic upon a screen or plate placed in the system's air stream. This evaporating surface is small and the performance of the device deteriorates as the evaporating anesthetic rapidly cools the surface. Also, a stuck needle valve may cause an improper dosage to be administered.

Another device uses a wick to draw the liquid from a pool up into the air stream for evaporation. The wick rapidly becomes cool and soaked with moisture condensation, decreasing the efficiency and accuracy of the system.

In an attempt to avoid the loss in efficiency and accuracy caused by rapidly cooling evaporating surfaces, some systems obtain their anesthetic vapor by bubbling oxygen up through or passing oxygen over a body of volatile liquid anesthetic. This requires a relative excess of gas to vaporize the desired amounts of anesthetic, resulting in the constant overfilling of the closed circuit. Some of the gas must periodically be emptied from the system, making this method imprecise and troublesome to operate.

The primary objective of this invention is the provision of a vaporizing device whose evaporating surface will not cool quickly during operation. The large heat capacity necessary to realize this objective is attained by constructing the major portion of the device from a single block of highly heat conductive material.

Still further objects and the entire scope of applicability of the present invention will become apparent from the detailed description given hereinafter. It should be understood, however, that the detailed description and specific example is given by way of illustration only and, while indicating a preferred embodiment of the invention, is not given by way of limitation, since various changes and modifications within the spirit and scope of the invention will become apparent to those skilled in the art from this detailed description.

By using an evaporator whose surface area is large with respect to its overall size the invention achieves the additional objective of excellent efficiency of evaporation without a corresponding increase in size.

This efficient evaporation coupled with the use of a liquid anesthetic dispenser controlled by a hypodermic syringe provide the anesthetist with accurate control over the dosage, and there is little opportunity for mechanical failure to result in the accidental administration of an improper dosage.

Briefly, the anesthetic vaporizer of this invention consists of a vertical finned evaporating tower mounted upon a base, the base and tower being of unitary construction. A housing connects to the base and encloses the tower. A petcock in the housing receives a standard syringe and allows liquid anesthetic to be dripped upon the top of the tower and evaporated within the housing. A passage in the base is connected in series with the closed anesthesia system, and a portion of the system's gas mixture passing therethrough is diverted up inside the housing, where it picks up the anesthetic vapor, and then back down into the system air stream.

A more detailed description of the invention may be had by reference to the drawings in which:

FIG. 1 is a sectional view of the vaporizer, showing its connections to the anesthesia system;

FIG. 2 is a section taken along line 2—2 of FIG. 1;

FIG. 3 is a section taken along line 3—3 of FIG. 2; and

FIG. 4 is a section taken along line 4—4 of FIG. 2.

Referring now to FIG. 1, the finned evaporating tower 10 extends vertically upward from base 11. Both the tower 10 and the base 11 are fabricated from a single block of material having high heat conduction, preferably copper. A cylindrical housing 12 fits over and encloses the tower 10 and screws onto base 11, making a vapor-tight seal. The circular cross section of base 11 may be seen in FIG. 2. The liquid anesthetic is dispensed onto the evaporating tower 10 from a standard hypodermic syringe 20 (shown in broken line) inserted into petcock 13 which is mounted in the top of housing 12. Arm 14 operates a valve within the petcock by which the passage through the petcock may be opened or closed.

The evaporation tower 10 consists of a spaced vertical array of annular fins 15 spaced apart by short cylindrical segments 18 and topped by convex upward hemisphere 19. Fins 15 are relatively thick at the center where they meet sections 18, having their sloping upper surfaces 16 and lower surfaces 17 converging at the periphery. The lower surface 17 of hemisphere 19 is identical to the lower surfaces 17 of fins 15.

The volatile anesthetic liquid is dripped from petcock 13 upon the center and topmost portion of hemisphere 19. It then spreads over the surface of the hemisphere, which acts to distribute the liquid evenly about its periphery and causes it to run evenly down over the periphery of the lower evaporating surface. It follows the path shown by the arrows in FIGURE 1. The large evaporating surface afforded by this configuration insures that most, if not all, of the liquid anesthetic will be evaporated as it travels down over the successive fins; any liquid which remains unevaporated at the bottom of tower 10 will be collected in cup portion 21 at its base and will remain there for subsequent evaporation. In practice, in the embodiment of the invention here described, it has been found that even when forced with quantities of anesthetic greater than used clinically, substantially all of the liquid is evaporated during its travel down the evaporating tower, and the cup 21 of this embodiment, having a capacity of 1.7 cc., has been found more than adequate.

The evaporating tower 10 has been designed to minimize the collection of water condensation upon the evaporating surfaces, which would tend to decrease the efficiency of the desired anesthetic evaporation. It has been found that such liquid anesthetics as ether and fluothane will flow on the underside of a surface as long as it is at an angle of 10 degrees or more above the horizontal plane, while water will not flow on the underside of a surface which is at an angle above the horizontal plane of any less than 30 degrees, and this differential has been used in the design of the evaporating tower of this invention to achieve the results desired. Lower surfaces 17 of hemisphere 19 and fins 15 are designed to make an angle above the horizontal plane of between 10 and 30 degrees so that the liquid anesthetic will flow along these surfaces but water will not. Therefore, any water vapor condensing on hemispherical surface 19 or upper fin surfaces 16 will not flow along the undersurface 17 but will drip off the periphery of the hemisphere or the fins onto base 11, thus tending to remove such water vapors from the evaporating surfaces. In practice, the angle which surfaces 17 make with the horizontal plane has been set as 18 degrees so that even if the surface on which the vaporizer is set is not quite level, the undersurfaces will still make an angle of at least 10 degrees with the horizontal plane and permit the flow of the anesthetic fluid.

In operation, the vaporizer is connected into the closed system so that the circulating mixture of gases in the system passes through a passage in cylindrical base 11. The passage through base 11, as may be seen in FIG. 1, consists of an input chamber 22, the cone of a Venturi tube 23 and an output or suction chamber 24 surrounding Venturi cone 23. The periphery of input chamber 22 is threaded to receive input fitting 25, which adapts the exhalation breathing tubing 26 coming from the patient, and which is generally of smaller diameter, to the larger diameter opening of the input chamber 22. The output or suction chamber 24 is connected to the exhalation port 29 of a standard anesthesia machine, shown dotted in FIG. 1, by means of output adapter 27 and nut 28. The end of output chamber 24 is threaded to receive one end of output adapter 27, and the two ends of nut 28 are reverse threaded to engage the threads on the other end of output adapter 27 and on the end of exhalation port 29 and to permit the chamfered end of output adapter 27 to be drawn against its seat on exhalation port 29 with a vapor-tight seal. Different makes of anesthesia machines would, of course, require different size adapters.

Input chamber 22 is connected to the interior of housing 12 by means of conduits or passageways 32 in base 11. Angled extensions 34 screw into the top of base 11 and extend the channel formed by passageways 32 well up into the interior of housing 12 beyond the top surface 35 of base 11. These passageways 32 and their extensions 34 may be seen most clearly in FIG. 3. The interior of housing 12 is connected to output or suction chamber 24 by two sharply angled connecting passageways which may be most clearly seen in FIG. 4. Passageway 36 extends from surface 35 of base 11 downward at a slight angle with the vertical plane and opens into horizontal conduit 37 which in turn opens into output chamber 24. Threaded valve plug 38, provided with knurled knob 39, is adapted, when screwed into place, to block passageway or conduit 36—37 and prevent gas from circulating from the interior of housing 12 to output chamber 24.

The respired mixture of gases expands from exhalation breathing tube 26 into the chamber formed by the large end of input fitting 25 and input chamber 22, where it is believed that according to Bernoulli's principle, a slightly increased pressure is created. The passage of the gases through Venturi cone 23 followed by output or suction chamber 24 which is annular and surrounds cone 23, results in a decrease in pressure in suction chamber 24. These two effects create a pressure differential, which in practice amounts to about 3 mm. of mercury, between input chamber 22 and output or suction chamber 24. This pressure differential causes a portion of the expired gases to flow through passageways 32 and extensions 34 up into the interior of housing 12, mix with the anesthetic vapor there, and flow through passageways 36—37 back down into suction chamber 24 and back into the system. Thus the anesthetic which was vaporized in the interior of housing 12 is entrained in the bulk of the respired gaseous mixture flowing through base 11 and is carried into the anesthesia apparatus to continue in the closed circuit system back to the patient.

The heat required to effect evaporation is supplied to evaporation tower 10 by two means. Some heat is picked up from the patient's exhaled air as it passes through base 11, and is conducted from base 11 up into tower 10 which is integral therewith. The surrounding atmosphere warms housing 12, and this heat is conducted to base 11 via the tight, heat-transferring connection between base 11 and housing 12 and thence to tower 10. The fabrication of tower 10 and base 11 from a single block of heat conducting material, such as copper, provides exceptional temperature stability of the evaporating surfaces. Any small amounts of water which have condensed upon the evaporating tower, will, as described previously, have dripped from the peripheries of hemisphere 19 or fins 15 and collected upon upper surface 35 of base 11, and will then be aspirated through conduit 36—37 and back into the system. The amount of water condensate involved will be negligible.

There has been provided by the herein described anesthetic vaporizer a highly efficient and reliable vaporizer especially for the purposes desired. In use, the vaporizer permits precise, smooth conduct of anesthesia, particularly with ether, and patients on which it has been used have shown an unusually prompt, smooth recovery.

I claim:

1. An anesthetic vaporizer for use in an anesthesia system comprising a main body having a base portion and an evaporation tower extending vertically upward from said base portion, a housing in spaced relation enclosing said tower and connected to said base portion, a means for introducing liquid anesthetic to the top of said tower, a passage extending through said base portion and having input and exhaust ends, first and second conduit means each connecting the interior of said housing with said passage, said first conduit means opening into said passage at a point closer to said input end than said second conduit means, means for creating a pressure differential such that the pressure at the opening of said first conduit means into said passage is higher than the pressure at the opening of said second conduit means into said passage, whereby liquid anesthetic is vaporized within said housing and a portion of the circulating gaseous mixture of the closed system, which passes through said passage, is caused by said pressure differential to be diverted from said passage through said first conduit means, into the interior of said housing where it mixes with the vaporized anesthetic, and back through said second conduit means into said passage, thus entraining the vaporized anesthetic in the circulating gaseous mixture of the system.

2. The apparatus of claim 1 in which said evaporation tower has an essentially circular cross-section throughout the vertical extent of the region of evaporation, said tower having a top comprising a hemisphere convex upwardly, and said means for introducing the liquid anesthetic dispenses the anesthetic on the center and topmost point of said hemisphere.

3. The apparatus of claim 1 in which the evaporating surface of said tower includes a spaced array of annular fins, the underneath surface of each of said fins being at an angle between 10 and 30 degrees above the horizontal plane.

4. The apparatus of claim 1 in which the means for creating a pressure differential is a Venturi tube having a throat located in said passage, an area of low pressure near said throat, said area of low pressure being in direct communication with said second conduit means.

5. An anesthetic vaporizer comprising a main body member having a gas passage therethrough for carrying gas to a patient, said gas passage having a first area carrying gas at a first pressure and at least one relatively constricted second area wherein the flowing gas maintains a second pressure which is lower than said first pressure, an enclosed vaporizing chamber having means defining a surface therein from which liquid anesthetic may vaporize, means for dispensing a liquid anesthetic onto said surface, means for circulating through said vaporizing chamber a portion of gases flowing through said passage, said circulating means comprising a first conduit communicating between said vaporizing chamber and said first area, and a second conduit communicating between said vaporizing chamber and said second area; whereby liquid anesthetic is vaporized within said chamber, and a portion of the circulating gaseous mixture which passes through said passage is caused to be diverted from said passage through said first conduit into the interior of said vaporizing chamber where it mixes with the vaporized anesthetic and back through said second conduit into said passage, thus introducing the vaporized anesthetic into the passage.

6. The apparatus of claim 5 wherein said means defining a surface is a tower having an external surface from which the evaporation of liquid anesthetic takes place, a base member attached in heat-transferring relationship to said tower and extending outside said vaporizing chamber.

7. The apparatus of claim 6 wherein the said tower extends upward from said base, said tower having an essentially circular horizontal cross-section throughout the vertical extent of the region of evaporation, said tower having a top comprising a hemisphere convex upward, said dispensing means being positioned above said hemisphere and adapted to apply the dispensed liquid to the center and topmost point of said hemisphere, whereby the liquid anesthetic will be caused by the said hemisphere to spread evenly around the periphery of the evaporated surface.

8. The apparatus of claim 6 wherein the said tower contains means for limiting the spread of water vapor condensation over the evaporating surfaces.

9. The apparatus of claim 8 wherein said means for limiting the spread of water vapor condensation over the evaporating surfaces of said tower comprises the provision in the flow path of the evaporating anesthetic of the underneath side of a surface making an angle above the horizontal plane of between 10 and 30 degrees.

10. The apparatus of claim 9 wherein the evaporating surface of said tower includes a spaced vertical array of annular fins, the underneath surface of each of said fins being at an angle of between 10 and 30 degrees above the horizontal plane.

11. A device for administering anesthetics comprising a main body having a first chamber therein with an opening to receive exhaled gases from a patient, a Venturi tube leading from said first chamber, a second chamber in direct communication with the throat of said Venturi tube, said second chamber having a lower pressure than said first chamber due to its relationship to said Venturi tube, an exhaust passage leading from said second chamber to a patient's inhalation side of the closed circuit system, a vertically oriented evaporation tower connected to said main body and having a surface from which a liquid anesthetic may vaporize, a housing spaced from and enclosing said tower, a first conduit leading from said first chamber to within said housing, a second conduit means connecting said second chamber to within said housing, means for applying liquid anesthetic to the top of said tower; whereby evaporation of the anesthetic takes place in said housing and a portion of the gases passing from said first chamber to said second chamber are drawn through said first conduit into said housing, and anesthetic vapors are carried from said vaporizing chamber into said second chamber through said second passage.

12. In an anesthetic vaporizing apparatus, a vaporizing chamber, a vertically oriented vaporizing tower of essentially solid construction located in said vaporizing chamber, said tower having its uppermost surface convex upwardly, said tower having a spaced vertical array of fins having their underneath surfaces at an angle between 10 and 30 degrees above the horizontal plane, means dispensing liquid anesthetic on the top of said tower, and conduit means for carrying a vaporized anesthetic from said vaporizing chamber to a patient.

References Cited in the file of this patent
UNITED STATES PATENTS

| | | |
|---|---|---|
| 2,538,986 | Switzer | Jan. 23, 1951 |
| 2,869,540 | Hamm | Jan. 20, 1959 |
| 2,872,167 | Pratt | Feb. 3, 1959 |
| 2,891,542 | Pentecost | June 23, 1959 |